(12) United States Patent
Printezis et al.

(10) Patent No.: US 7,853,627 B2
(45) Date of Patent: Dec. 14, 2010

(54) DENSE PREFIX GENERATION FOR GARBAGE COLLECTION

(75) Inventors: Antonios Printezis, Burlington, MA (US); John W. Coomes, Felton, CA (US)

(73) Assignee: Oracle America, Inc., Redwood City, CA (US)

( * ) Notice: Subject to any disclaimer, the term of this patent is extended or adjusted under 35 U.S.C. 154(b) by 478 days.

(21) Appl. No.: 11/725,918

(22) Filed: Mar. 20, 2007

(65) Prior Publication Data

US 2008/0235305 A1   Sep. 25, 2008

(51) Int. Cl.
G06F 12/02 (2006.01)
G06F 17/30 (2006.01)

(52) U.S. Cl. .................. 707/814; 711/173; 711/159; 711/E12.009

(58) Field of Classification Search .................. None
See application file for complete search history.

(56) References Cited

U.S. PATENT DOCUMENTS

| | | | | |
|---|---|---|---|---|
| 4,462,073 A | * | 7/1984 | Grondalski | 712/207 |
| 5,903,899 A | * | 5/1999 | Steele, Jr. | 707/206 |
| 6,047,125 A | | 4/2000 | Agesen et al. | 717/148 |
| 6,192,517 B1 | | 2/2001 | Agesen et al. | 717/154 |
| 6,249,793 B1 | | 6/2001 | Printezis et al. | 707/206 |
| 7,010,555 B2 | * | 3/2006 | Blandy et al. | 707/206 |
| 7,136,887 B2 | | 11/2006 | Garthwaite et al. | 707/206 |
| 7,302,515 B1 | * | 11/2007 | Detlefs | 711/6 |
| 2004/0168028 A1 | * | 8/2004 | Cierniak | 711/125 |
| 2007/0294499 A1 | * | 12/2007 | Garthwaite | 711/170 |

OTHER PUBLICATIONS

Sun Microsystems, "Memory Management in the Java HotSpot Virtual Machine", Apr. 2006, pp. 1-21.
John Coomes, Tony Printezis, 2006 JavaOne Conference, "Performance Through Parallelism: Java HotSpot GC Improvements", Sun Microsystems, Inc., http://java.sun.com, May 16-18, 2006, pp. 1-60.
"The Memory Management Reference Beginner's Guide Recycling", Retrieved from the Internet on Jan. 25, 2007, www.memorymanagement.org/articles/recycle.html, pp. 1-5.
"The Memory Management Reference Beginner's Guide Overview", Retrieved from the Internet Jan. 25, 2007, www.memorymanagement.org/articles/begin.html, pp. 1-5.

* cited by examiner

*Primary Examiner*—Reginald G Bragdon
*Assistant Examiner*—Daniel J Bernard
(74) *Attorney, Agent, or Firm*—Brooks Kushman P.C.

(57) ABSTRACT

A technique for establishing a dense prefix for a memory in a computer system. Memory is divided into a plurality of chunks. An efficiency factor is generated for each chunk in one or more chunks contained in the plurality of chunks. The efficiency factor may be based on an amount of memory to be reclaimed, an amount of memory to be scanned and an amount of memory to be copied relative to the chunk. A dense prefix is then established for the memory based on an efficiency factor associated with a chunk.

22 Claims, 4 Drawing Sheets

DENSE PREFIX GENERATION FOR GARBAGE COLLECTION

BACKGROUND

Memory management relates to managing memory resources in a computer system. This management may include allocating memory used by programs running on the computer system as well as reclaiming memory that had been allocated to the programs but is no longer used by the programs. In many programming languages, memory allocated to a program is often allocated from a heap. A heap, as used herein, relates to an area of memory that may be used for dynamic memory allocation.

In some languages, management of the heap is the programmer's responsibility. This approach to memory management is often termed manual memory management. The complexity of manual memory management may lead to many common errors that may cause unexpected or erroneous program behavior and crashes. As a result, a large portion of developer time may be spent debugging and trying to correct such errors.

One common error that may occur when using manual memory management is space leaks. Space leaks occur when allocated memory is no longer referenced but is not released. For example, if a program frees space utilized by a linked list but just frees the first element of the list, the remaining list elements may no longer be reachable by the program and consequently may neither be used nor recovered. If enough leaks occur, they may keep consuming memory until all available memory is exhausted.

An alternative approach to manual memory management is automatic memory management. Automatic memory management relates to a technique for managing memory that often includes provisions for automatically reclaiming memory that is "unreachable" by software (e.g., programs) running on a system. Automatic memory management may be implemented as a service that is part of a programming language or an extension to the language.

Garbage collection is a form of automatic memory management that relates to automatically finding and reclaiming unreachable memory. Garbage collection is widely utilized by many modern object-oriented programming languages. Garbage collection prevents memory loss due to, for example, space leaks, because objects that are unreachable are automatically reclaimed.

Garbage collection is often implemented in the form of a garbage collector. A garbage collector is responsible for, inter alia, reclaiming areas of memory that are considered to be unreachable. These areas are often said to be "dead" or "garbage" and are considered eligible for reclaiming by the garbage collector. Areas in memory that are reachable are often said to be "live". These areas may include areas that have been allocated to and are actively used by the software. Live areas are not collected by the garbage collector.

Various techniques may be used by garbage collectors to collect garbage. One well-known technique is the "mark-compact" technique. This technique typically involves marking all live areas of memory then reclaiming areas of memory that are not marked which are assumed to be garbage. The process of reclaiming may involve "sliding" live areas over the dead areas to compact all of the live areas at one end of the memory. References to the live areas that were slid are then updated to reflect their new location. The end result is usually a memory that has all the live areas at one end of the memory followed by a single contiguous area of unused memory.

Sliding large areas of memory and updating references to them, however, may be very expensive in terms of time and utilization of computational resources. Since memory tends to be quite plentiful these days, "wasting" some amount of memory in order to improve efficiency and cut down on excessive sliding is generally acceptable and an attractive approach. Thus, some sliding garbage collection implementations may allow a certain amount of memory to be "wasted" in order to cut down on the number of times live areas of memory need to be slid.

For example, assume a memory contains a 1 megabyte (MB) live area followed by an eight-byte dead area, a 10 MB live area and a 10 MB dead area, in that order. A garbage collector may be configured to waste the eight-byte dead area in order to avoid having to slide the 10 MB live area over the eight-byte dead area to reclaim it.

Some garbage collection techniques employ a "dense prefix" that may be used to identify areas of memory that should and should not be moved. Typically, anything before the dense prefix is not moved and live areas after the dense prefix are moved. Thus, in the example above, establishing the dense prefix right after the 1 MB live area causes the 10 MB live area to be moved over the eight-byte dead area. On the other hand, establishing the dense prefix right after the 10 MB live area would cause the 10 MB to remain and not be moved.

SUMMARY

As can be seen in the above example, where the dense prefix is established tends to influence how much memory is copied during garbage collection. Since copying memory tends to be costly with regards to time and consumption of system resources, properly establishing the dense prefix may prove to be crucial to, e.g., an application's performance on a system. One problem with prior techniques for establishing the dense prefix is that they often do not adequately take into consideration many usage aspects of the memory. For example, some techniques may simply establish the dense prefix based on an amount of allowable wasted memory. Relying simply on this metric may not truly reflect how the memory is being used and consequently may not prove to be an efficient technique for establishing the dense prefix.

The techniques described herein overcome such deficiencies by providing an efficient approach for establishing a dense prefix for a memory in a computer system. In accordance with an aspect of the techniques described herein, memory is divided into a plurality of chunks. An efficiency factor is generated for each chunk in one or more chunks contained in the plurality of chunks. The efficiency factor may be based on an amount of memory to be reclaimed, an amount of memory to be scanned and an amount of memory to be copied relative to the chunk. A dense prefix is then established for the memory based on an efficiency factor associated with a chunk. Illustratively, the dense prefix is established at a chunk associated with a maximum efficiency factor.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Aspects of the techniques described herein are described as being applied to a memory heap. This is not intended to be a limitation. Rather, aspects of the techniques described herein may be adapted for use with other types of memory structures as well as memories in general.

Figure 1:
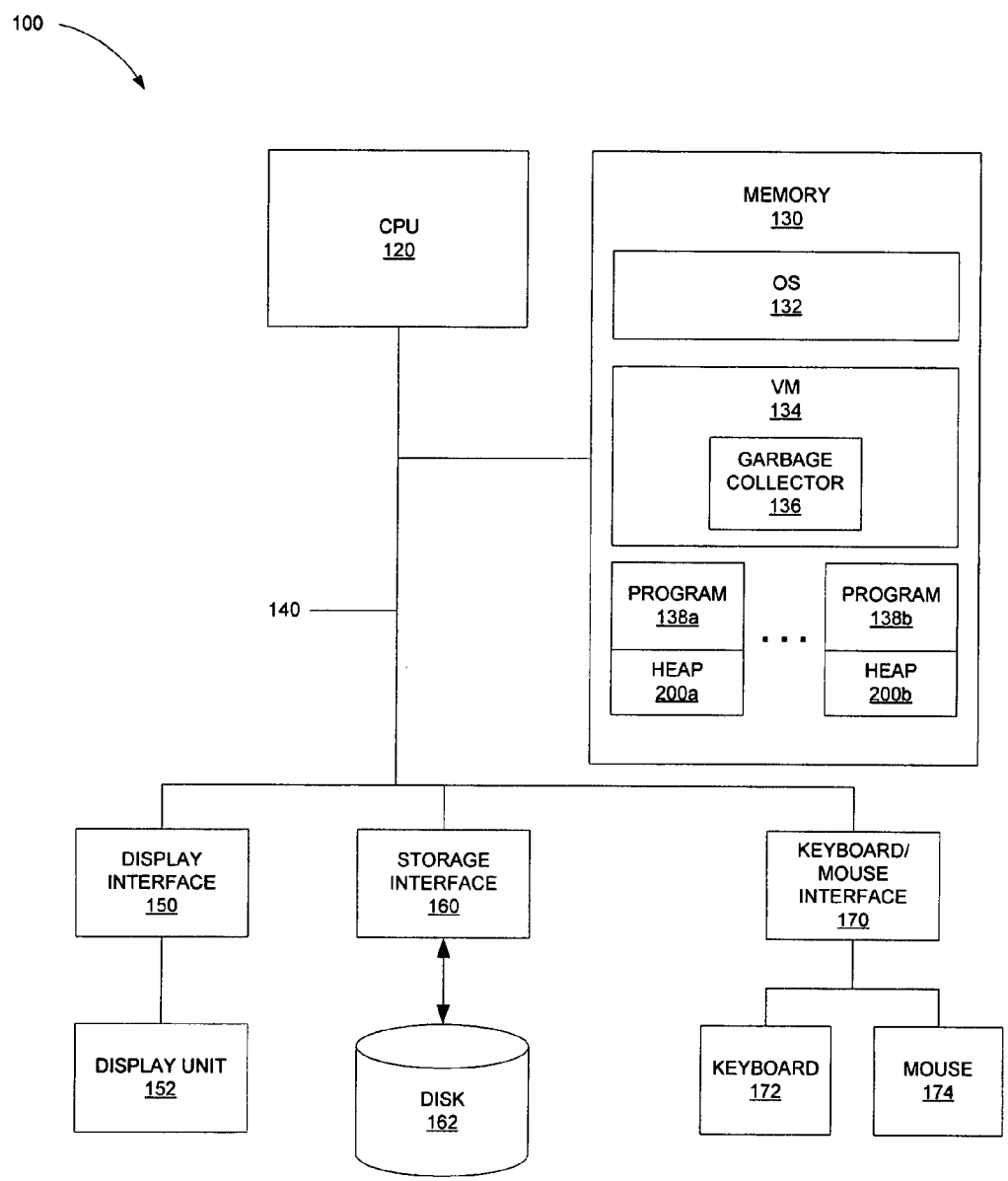
FIG. 1 is a high-level block diagram of an example of a computer system that may be used with the techniques described herein.

FIG. 1 is a high-level block diagram of an example of a computer system 100 that may be used with the techniques described herein. Referring to FIG. 1, system 100 comprises a central processing unit (CPU) 120 coupled to memory 130 and various interfaces via a local bus 140. The interfaces include a display interface 150, a storage interface 160 and a keyboard/mouse interface 170 which are coupled to various peripheral devices including display unit 152, disk 162 and, keyboard 172 and mouse 174, respectively. It should be noted that computer system 100 is one example of a computer system that may be used with the techniques described herein. Other computer systems, including computer systems far more complex than system 100, may be adapted to take advantage of the techniques described herein. An example of a computer system that may be used with the techniques described herein is a Sun Ultra 40 Workstation, available from Sun Microsystems Incorporated, Santa Clara, Calif.

The CPU 120 is a conventional processor that comprises processing circuitry for executing instructions and manipulating data contained in memory 130 which may include instructions and data that implement aspects of the techniques described herein. The local bus 140 is a point-to-point interconnect bus configured to couple various entities contained in system 100 including the processor 120, memory 130 and interfaces 150, 160 and 170, and enable data and signals to be transferred between these entities.

The display interface 150 is a conventional display interface (e.g., a graphics card) that comprises circuitry configured to enable the processor 120 to display information on the display unit 152, such as text, images, documents and the like. Display unit 152 is a conventional display unit, such as a Cathode Ray Tube (CRT), a Liquid Crystal Display (LCD) display device and the like. The keyboard/mouse interface 170 comprises circuitry configured to interface the keyboard device 172 and the mouse device 174 to the system 100 and enable data and signals to be transferred between these devices and the system 100. The keyboard device 172 may be a conventional 104-key keyboard and the mouse device 174 may be a conventional mouse.

The storage interface 160 is a conventional storage device interface comprising circuitry configured to interface storage devices, such as disk unit 162, to the bus 140 and enable data and signals to be transferred between the storage devices and entities on the bus 140. Disk unit 162 is a conventional disk unit configured as a data storage that stores information (data) that may be used by system 100, such as documents, images, executable files, data files and the like.

Memory 130 is a computer-readable medium implemented as a conventional random access memory (RAM) data storage comprising RAM devices, such as dynamic RAM (DRAM) devices. Memory 130 is configured to hold various software and data structures including operating system (OS) 132, virtual machine (VM) 134, garbage collector 136, programs 138 and heaps 200.

The OS 132 is a conventional operating system comprising computer-executable instructions and data that implement various conventional operating system functions, such as scheduling VM 134 for execution by the processor 120 and controlling access to various system resources. VM 134 is a software process comprising computer executable instructions and data configured to implement a virtual machine for, inter alia, controlling the execution of various programs, such as programs 138, on system 100. Programs 138 may be various application programs that execute under the control of VM 134. Each program 138 is illustratively associated with a heap 200 which may be used by the program to hold various dynamically allocated data objects, such as integers, character strings, arrays and the like. Garbage collector 136 comprises computer-executable instructions configured to implement a garbage collector that collects garbage contained in the heaps 200. Moreover, these computer-executable instructions illustratively include instructions that are configured to generate dense prefixes for the heaps 200 in accordance with aspects of the techniques described herein.

Figure 2:
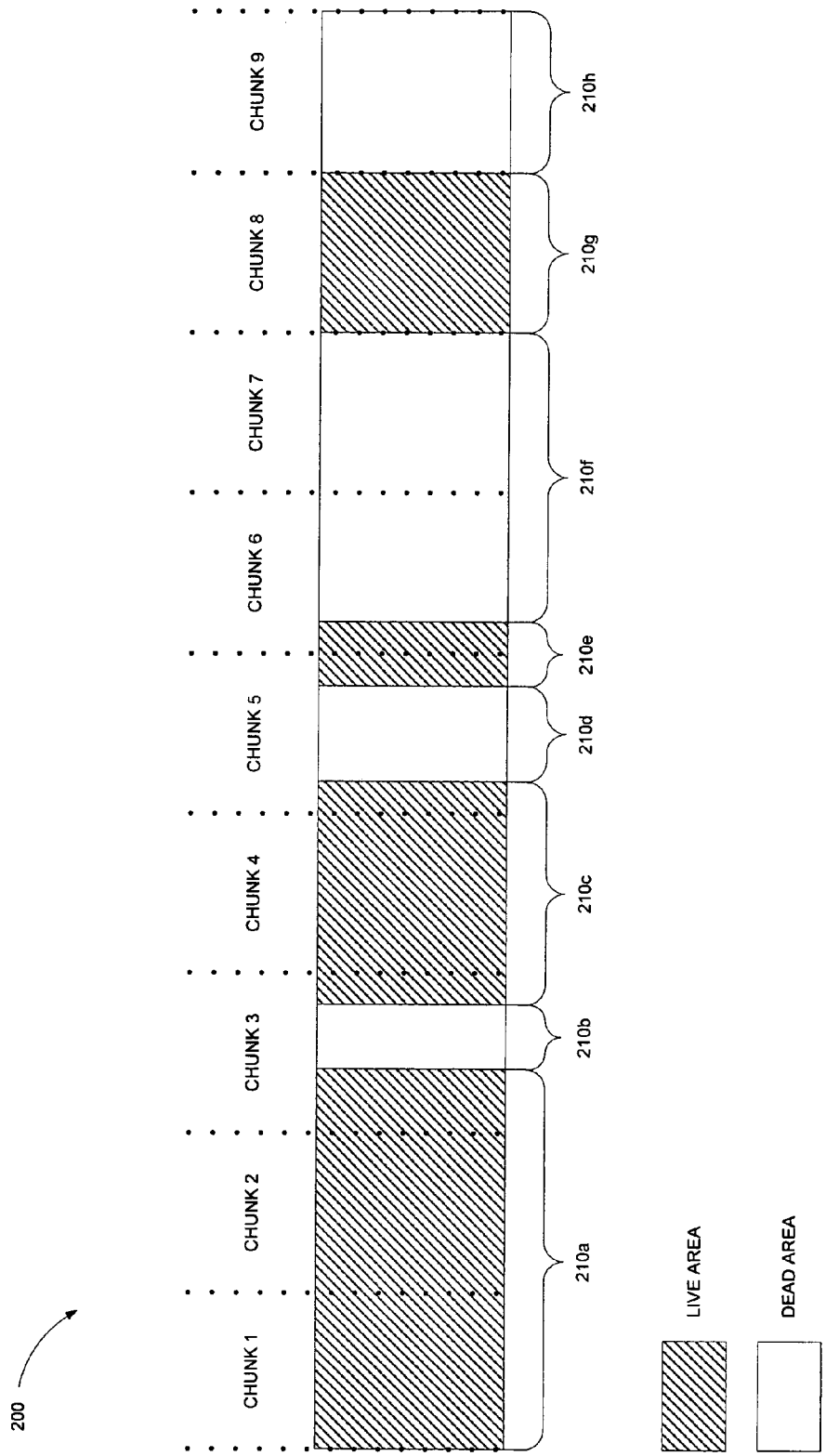
FIG. 2 illustrates an example of a memory heap that may be used with the techniques described herein.

The heaps 200 are areas of memory 130 that, as noted above, may be used by the programs 138 to hold dynamically allocated objects. FIG. 2 illustrates an example of a heap 200 that may be used with the techniques described herein. Heap 200 comprises live areas 210a, 210c, 210e and 210g, and dead (garbage) areas 210b, 210d, 210f and 210h. The live areas include portions of the heap 200 that are "reachable" by software running on system 100 (e.g., a program 138). These portions may contain information, various dynamically allocated objects, such as integers, strings, arrays, and the like, that are actively used by the software. The garbage areas include portions of the heap 200 are "unreachable" by software running on system 100. These areas are considered garbage and are eligible to be reclaimed by the garbage collector 136.

Operationally, programs 138 make requests to the VM 134 to allocate portions of memory contained in the heaps 200. VM 134 processes the requests which may include tracking memory portions that has been allocated as well as tracking the usage and fragmentation of the memory. When a particular heap 200, e.g., reaches a predetermined level of usage or a predetermined level of fragmentation, VM 134 may schedule garbage collector 136 for execution. During execution, garbage collector 136 analyzes the heap 200 and, inter alia, performs garbage collection on the heap 200 to reclaim portions of the heap that are garbage. The garbage collection illustratively includes generating a dense prefix for the heap 200 in accordance with the techniques described herein.

It should be noted that functions performed by the system 100, including functions that implement aspects of the techniques described herein, may be implemented using some combination of hardware and/or software. It should be further noted that computer-readable mediums, such as volatile memories, non-volatile memories, flash memories, removable disks, non-removable disks and the like, may be configured to comprise computer-executable instructions and/or computer data that implement aspects of the techniques described herein. In addition, it should be noted that various electromagnetic signals, such as wireless signals, electrical signals carried over a wire, optical signals carried over optical fiber and the like, may be encoded to carry computer-executable instructions and/or data that implement aspects of the techniques described herein over a communications network, such as, e.g., the Internet.

Figure 3:
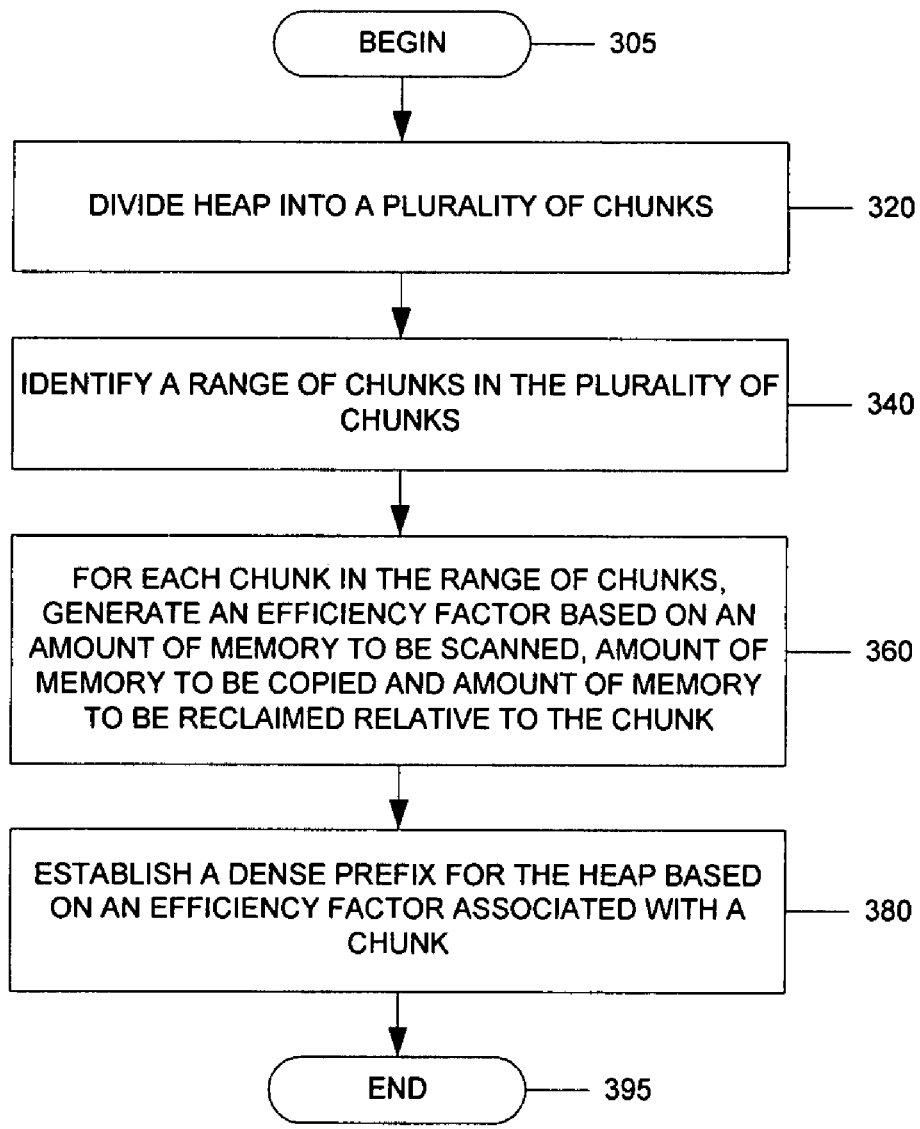
FIG. 3 is a flow chart of a sequence of steps that may be used to establish a dense prefix for a memory heap in accordance with an aspect of the techniques described herein.

FIG. 3 is a flow chart of a sequence of a sequence of steps that may be used to establish a dense prefix for a memory heap contained in a memory in accordance with an aspect of the techniques described herein. The sequence begins at step 305 and proceeds to step 320 where the heap is divided into a series of chunks. A chunk as used herein relates to a portion of memory. Illustratively, the chunks are equal-sized chunks. Note that this step may be performed prior to a marking phase in a garbage collection process.

At step 340, a range of chunks to process in the heap is identified. This range may include one or more chunks which lie between two prefix values Pmin and Pmax of the heap where:

Pmin relates to a maximum prefix from the start of heap that is full of live objects (i.e., contains no wasted space); and Pmax relates to a minimum prefix in the heap that contains more than a desired maximum amount of garbage objects as indicated by an acceptable amount of memory that is allowed to be wasted.

Pmin and Pmax may be determined using a binary search technique. The amount of memory that is allowed to be wasted may be based on a predetermined percentage of the total memory in the heap. For example, if the heap is 100 megabytes (MB) in size and it is predetermined that 10 percent is allowed to be wasted, the acceptable amount of wasted memory would be 10 MB.

At step 360, an efficiency factor is generated for each chunk in the range of chunks based on an amount of memory to be scanned, an amount of memory to be copied and an amount of memory to be reclaimed relative to the chunk. Details of a technique that may be used to generate an efficiency factor based on this criteria will be described further below with reference to FIG. 4. At step 380, the dense prefix for the heap is then established based on an efficiency factor associated with a chunk. Illustratively, the dense prefix is established at a chunk that is associated with a maximum efficiency factor.

Figure 4:
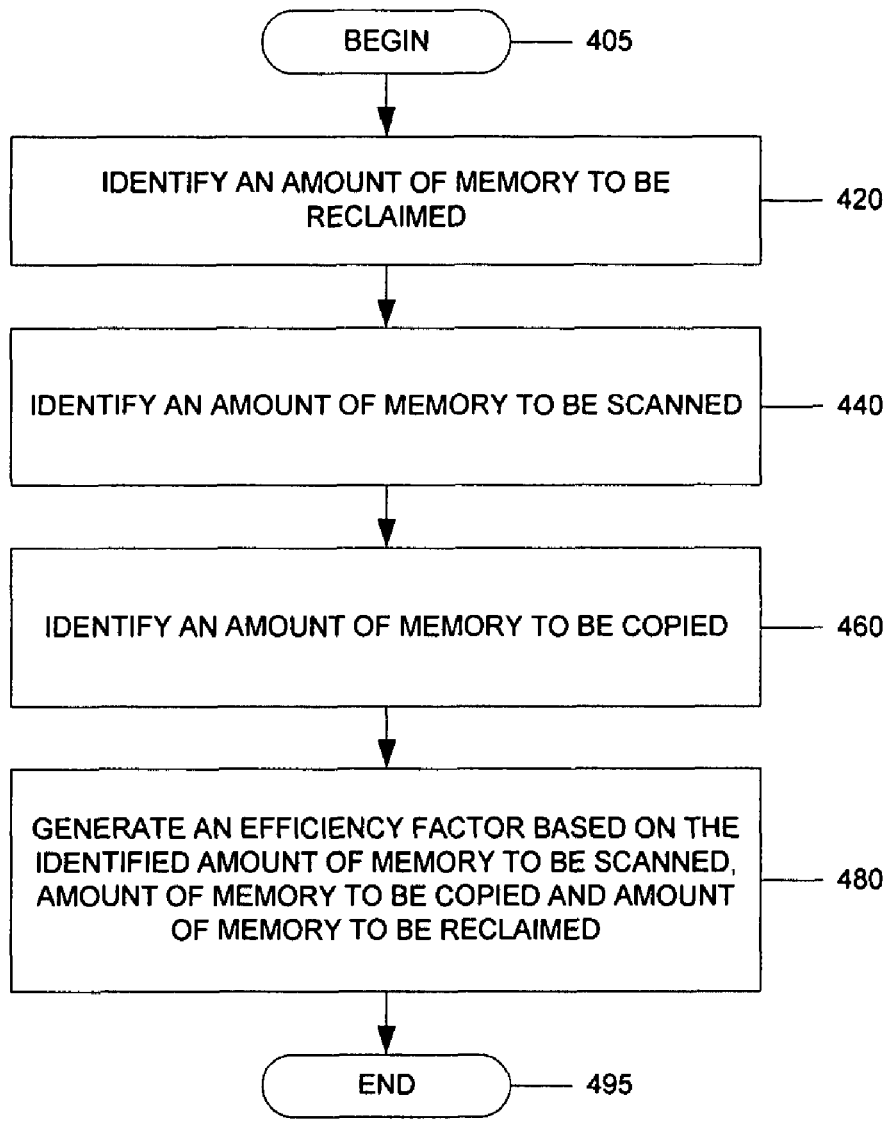
FIG. 4 is a flow chart of a sequence of steps that may be used to generate an efficiency factor for a chunk of memory contained in a memory heap in accordance with an aspect of the techniques described herein.

FIG. 4 is a flow chart of a sequence of steps that may be used to generate an efficiency factor associated with a chunk in accordance with an aspect of the techniques described herein. The sequence begins at step 405 and proceeds to step 420 where an amount of memory to be reclaimed is identified. Illustratively, the amount of memory to be reclaimed includes an amount of garbage located in the heap after the chunk. At step 440, an amount of memory to be scanned is identified. Illustratively, this amount includes live areas in the heap before the end of the chunk. At step 460, an amount of memory to be copied is identified. Illustratively, this amount includes live areas in the heap after the chunk. At step 480, the efficiency factor for the chunk is generated based on the identified amount of memory to be reclaimed, memory to be scanned and memory to be copied.

A formula that may be used to generate the efficiency factor based on these amounts is as follows:

$$F=R/(S+(\alpha *C))$$

Where:
F is the efficiency factor,
R is the amount of memory reclaimed,
S is the amount of memory to be scanned,
C is the amount of memory to be copied, and α is a factor that may be used to establish an aggressiveness of the dense prefix generation.

Typically, the higher the value of "α" the more likely that more free space will be sacrificed in favor of less copying. Values of "α" that are in the range of 1.0 to 1.5 may be most helpful.

In this manner, an efficiency factor is generated for each chunk in one or more chunks contained in the plurality of chunks, the efficiency factor based on an amount of memory to be reclaimed, an amount of memory to be scanned and an amount of memory to be copied relative to the chunk.

The above-described amount of memory to be reclaimed, amount of memory to be scanned and the amount of memory to be copied may be identified from information learned during various phases of garbage collection. For example, during a marking phase, areas of live and dead memory in the heap are typically identified. The identified live areas may in turn be used to identify the amount of memory to be scanned as well as the amount of memory to be copied. In addition, the identified dead areas may be used to identify the amount of memory to be reclaimed.

The following example illustrates how aspects of the above-described techniques may be used on a heap 200 contained in system 100. Assume, for example, that the heap 200 illustrated in FIG. 2 represents the state of heap 200a and that VM 134 has determined that the amount of memory in use in heap 200a warrants performing garbage collection on heap 200a. In addition, assume that heap 200a is 45 MB in length and that the lengths for areas 210a, 210b, 210c, 210d, 210e, 210f, 210g and 210h are 12, 2, 7, 3, 2, 9, 5 and 5 MB, respectively.

Garbage collector 136 divides the heap into a series of chunks (step 320). Assume the heap 200a is divided into nine equal-sized 5 MB chunks as illustrated by the dotted lines in FIG. 2. Garbage collector 136 identifies a range of chunks to process (step 340). As noted above, this range may be identified by identifying a Pmin and a Pmax for heap 200a, as described above. Since chunk 3 is the first chunk from the beginning of the heap 200a that contains garbage and chunks 1 and 2 do not contain any garbage, Pmin is established at chunk 2. As for Pmax, assume that the maximum allowable wasted space is 6 MB. Thus, Pmax is established at chunk 6.

For each chunk in the range of chunks, the garbage collector 136 generates an efficiency factor based on an amount of memory to be scanned, an amount of memory to be copied and an amount of memory to be reclaimed (step 360). Specifically, in this example, for each chunk in the range from chunk 2 to chunk 6, garbage collector 136 identifies an amount of memory to be reclaimed which illustratively is an amount of memory that is garbage beyond the chunk (step 420). In this example, for chunks 2, 3, 4, 5 and 6, the amount of memory that is garbage beyond the chunk would illustratively be 19, 17, 17, 14 and 10 MB, respectively. Garbage collector 136 then identifies an amount of memory to be scanned which illustratively is an amount of live memory before the end of the chunk (step 440). In this example, for chunks 2, 3, 4, 5 and 6, the amount of memory to be scanned would illustratively be 10, 13, 18, 20 and 21 MB, respectively. Garbage collector 136 then identifies an amount of memory to copy which is illustratively an amount of live memory located after the chunk (step 460). In this example, for chunks 2, 3, 4, 5 and 6, the amount of memory to be copied would illustratively be 16, 13, 8, 6 and 5 MB, respectively.

An efficiency factor for each chunk in the range is then generated based on the identified amount of memory to be reclaimed, the identified amount of memory to be scanned and the identified amount of memory to be copied. Assume the above formula is used to generate the efficiency factors and that a value of 1.25 is used for "α". Thus, in this example, the efficiency factors for chunks 2, 3, 4, 5 and 6 would be (rounded to 2 places after the decimal point) 0.63, 0.58, 0.61, 0.51 and 0.37, respectively.

A dense prefix is then established for the heap based on an efficiency factor associated with a chunk (step 380). Assuming that the dense prefix is established at a chunk associated with a maximum efficiency factor, the dense prefix, in this example, be established at chunk 2.

While techniques described herein have been particularly shown and described with reference to particular embodiments, it will be understood by those skilled in the art that various changes in form and details may be made therein without departing from the scope and spirit of the invention encompassed by the appended claims. As such, the foregoing described embodiments are not intended to be limiting. Rather, any limitations to embodiments of the invention are presented in the following claims.

What is claimed is:

1. A computer implemented method comprising:
    dividing memory into a plurality of chunks;
    generating an efficiency factor for each chunk in one or more chunks contained in the plurality of chunks, the efficiency factor based on an amount of memory to be reclaimed, an amount of memory to be scanned and an amount of memory to be copied relative to the chunk, wherein the efficiency factor is proportional to the amount of memory to be reclaimed, and inversely proportional to the memory to be scanned and the amount of memory to be copied; and
    establishing a dense prefix for the memory at a chunk in the one or more chunks based on the efficiency factor generated for the chunk.

2. A method as defined in claim 1 wherein the efficiency factor is a maximum efficiency factor of all of the generated efficiency factors.

3. A method as defined in claim 1 wherein the memory is divided into equal-sized chunks.

4. A method as defined in claim 1 further comprising:
    identifying a range of chunks in the plurality of chunks,
    wherein the one or more chunks is contained in the range of chunks.

5. A method as defined in claim 4 wherein identifying a range of chunks further comprises:
    identifying a maximum prefix that contains only live areas in the memory; and
    identifying a minimum prefix that contains a predetermined amount of garbage objects,
    wherein the range of chunks is between the identified maximum prefix and identified minimum prefix.

6. A method as defined in claim 1 wherein the amount of memory to be reclaimed includes an amount of garbage located in a heap after the chunk.

7. A method as defined in claim 1 wherein the amount of memory to be scanned includes an amount of live areas in a heap before the end of the chunk.

8. A method as defined in claim 1 wherein the amount of memory to be copied includes an amount of live areas in a heap after the chunk.

9. An apparatus comprising:
    memory; and
    a processor coupled to the memory, the processor configured to:
    (a) divide the memory into a plurality of chunks;
    (b) generate an efficiency factor for each chunk in one or more chunks contained in the plurality of chunks, the efficiency factor based on an amount of memory to be reclaimed, an amount of memory to be scanned and an amount of memory to be copied relative to the chunk, wherein the efficiency factor is proportional to the amount of memory to be reclaimed, and inversely proportional to the memory to be scanned and the amount of memory to be copied; and
    (c) establishing a dense prefix for the memory at a chunk in the one or more chunks based on the efficiency factor generated for the chunk.

10. An apparatus as defined in claim 9 wherein the processor is further configured to:
    identify a range of chunks in the plurality of chunks,
    wherein the one or more chunks is contained in the range of chunks.

11. An apparatus as defined in claim 10 wherein the processor is further configured to:
    identify a maximum prefix that contains only live areas in the memory; and
    identify a minimum prefix that contains a predetermined amount of garbage objects,
    wherein the range of chunks is between the identified maximum prefix and identified minimum prefix.

12. An apparatus as defined in claim 9 wherein the amount of memory to be reclaimed includes an amount of garbage located in a heap after the chunk.

13. An apparatus as defined in claim 9 wherein the amount of memory to be scanned includes an amount of live areas in a heap before the end of the chunk.

14. An apparatus as defined in claim 9 wherein the amount of memory to be copied includes an amount of live areas in a heap after the chunk.

15. An apparatus comprising:
    means for dividing memory into a plurality of chunks;
    means for generating an efficiency factor for each chunk in one or more chunks contained in the plurality of chunks, the efficiency factor based on an amount of memory to be reclaimed, an amount of memory to be scanned and an amount of memory to be copied relative to the chunk, wherein the efficiency factor is proportional to the amount of memory to be reclaimed, and inversely proportional to the memory to be scanned and the amount of memory to be copied; and
    means for establishing a dense prefix for the memory at a chunk in the one or more chunks based on the efficiency factor generated for the chunk.

16. An apparatus as defined in claim 15 further comprising:
    means for identifying a range of chunks in the plurality of chunks,
    wherein the one or more chunks is contained in the range of chunks.

17. An apparatus as defined in claim 16 further comprising:
    means for identifying a maximum prefix that contains only live areas in the memory; and
    means for identifying a minimum prefix that contains a predetermined amount of garbage objects,
    wherein the range of chunks is between the identified maximum prefix and identified minimum prefix.

18. A computer readable medium comprising computer-executable instructions for:
    dividing memory into a plurality of chunks;
    generating an efficiency factor for each chunk in one or more chunks contained in the plurality of chunks, the efficiency factor based on an amount of memory to be reclaimed, an amount of memory to be scanned and an amount of memory to be copied relative to the chunk, wherein the efficiency factor is proportional to the amount of memory to be reclaimed, and inversely proportional to the memory to be scanned and the amount of memory to be copied; and establishing a dense prefix for the memory at a chunk in the one or more chunks based on the efficiency factor generated for the chunk.

19. A computer readable medium as defined in claim 18 wherein the efficiency factor is a maximum efficiency factor of all of the generated efficiency factors.

20. A computer readable medium as defined in claim 18 wherein the amount of memory to be reclaimed includes an amount of garbage located in a heap after the chunk.

21. A computer readable medium as defined in claim 18 wherein the amount of memory to be scanned includes an amount of live areas in a heap before the end of the chunk.

22. A computer readable medium as defined in claim 18 wherein the amount of memory to be copied includes an amount of live areas in a heap after the chunk.

* * * * *